United States Patent
Bansal et al.

(10) Patent No.: US 6,882,743 B2
(45) Date of Patent: Apr. 19, 2005

(54) AUTOMATED LUNG NODULE SEGMENTATION USING DYNAMIC PROGRAMMING AND EM BASED CLASSIFICATION

(75) Inventors: Ravi Bansal, Cranbury, NJ (US); Ning Xu, Champaign, IL (US)

(73) Assignee: Siemens Corporate Research, Inc., Princeton, NJ (US)

( * ) Notice: Subject to any disclaimer, the term of this patent is extended or adjusted under 35 U.S.C. 154(b) by 656 days.

(21) Appl. No.: 09/998,768

(22) Filed: Nov. 29, 2001

(65) Prior Publication Data

US 2003/0099391 A1 May 29, 2003

(51) Int. Cl.[7] .................................................. G06K 9/00
(52) U.S. Cl. ...................... 382/131; 382/173; 382/177
(58) Field of Search ................................. 382/128, 129, 382/130, 131, 132, 133, 134, 173, 177, 215; 600/407, 533, 538; 378/62

(56) References Cited

U.S. PATENT DOCUMENTS

| | | | | |
|---|---|---|---|---|
| 5,987,094 A | * | 11/1999 | Clarke et al. .............. | 382/128 |
| 6,078,680 A | * | 6/2000 | Yoshida et al. ............ | 382/128 |
| 6,141,437 A | * | 10/2000 | Xu et al. .................... | 382/130 |
| 6,760,468 B1 | * | 7/2004 | Yeh et al. ................... | 382/132 |
| 6,766,043 B1 | * | 7/2004 | Zeng et al. ................. | 382/128 |

* cited by examiner

Primary Examiner—Bhavesh M. Mehta
Assistant Examiner—Abolfazl Tabatabai
(74) Attorney, Agent, or Firm—Donald B. Paschburg; Chau & Associates, LLC

(57) ABSTRACT

There is provided a method for automatically segmenting lung nodules in a three-dimensional (3D) Computed Tomography (CT) volume dataset. An input is received corresponding to a user-selected point near a boundary of a nodule. A model is constructed of the nodule from the user-selected point, the model being a deformable circle having a set of parameters $\beta$ that represent a shape of the nodule. Continuous parts of the boundary and discontinuities of the boundary are estimated until the set of parameters $\beta$ converges, using dynamic programming and Expectation Maximization (EM). The nodule is segmented, based on estimates of the continuous parts of the boundary and the discontinuities of the boundary.

18 Claims, 5 Drawing Sheets

AUTOMATED LUNG NODULE SEGMENTATION USING DYNAMIC PROGRAMMING AND EM BASED CLASSIFICATION

BACKGROUND

1. Technical Field

The present invention generally relates to medical imaging and, in particular, to a method for automatically segmenting lung nodules using dynamic programming and Expectation Maximization (EM) classification.

2. Background Description

Mortality due to lung cancer is the leading cause for the cancer related deaths in the country. One of the main causes for such a high rate of mortality is the fact that it is very difficult to detect malignant lung nodules. Usually by the time nodules are detected, it is too late, the nodules are too large or too advanced to be effectively cured. Thus, there is a need for lung screening with the motivation for early detection of the malignant lung nodule at a stage where it can be effectively treated. Conventional chest X-rays (CXR) have been utilized for a long time. CXR are described by: Carreira et al., in "Computer-aided Lung Nodule Detection in Chest Radiography", Lecture notes in Computer Science, Image Analysis Applications and Computer Graphics, 1024, pp. 331–38, 1995; and Braum van Ginneken, in "Computer-aided Diagnosis in Chest Radiography", PhD Thesis, University of Utrecht, 1970. However, CXR are of limited use as only large lung nodules can be detected using CXR. With the advances in the X-ray Computed Tomography (CT) technology, there is a potential for screening of nodules which can be malignant. Using thin section multi-slice helical CT (hCT) scans, it is now possible to detect nodules which are as small as 3 mm in diameter. The use of hCT scans is described by: Aberle et al., in "Model-based Segmentation Architecture for Lung Nodule Detection in CT", Radiology, 217(P), 2000; and Aberle et al., in "Computer-aided Method for Lung Micronodule Detection in CT", Radiology, 217(P), 2000. Usage of a high resolution CT (HRCT) image dataset allows for quantitative measurements, such as, size, shape and density, for each nodule to be made. However, each helical CT scan of a patient leads to a volume consisting of 500 to 600 slices with 512×512 voxels in each slice. Thus, the advantages of having high resolution CT over CXR can be fast lost without the help of efficient image analysis and interpretation methods. Computer-assisted nodule detection has already transformed the way lung cancer screening is done by providing better ways for visualization, detection and characterization of lung nodules. Computer-assisted nodule detection is described by: Aberle et al., in "Computer-aided Method for Lung Micronodule Detection in CT", Radiology, 217(P), 2000; Kostis et al., in "Computer-aided Diagnosis of Small Pulmonary Nodules", Seminars in Ultrasound, CT, and MRI, 21(2), pp. 116–28, 2000; Fan et al., in "Automatic Detection of Cellular Necrosis in Epithelial Cell Cultures", SPIE Medical Imaging, February 2001; and Jacobson et al., in "Evaluation of Segmentation Using Lung Nodule Phantom CT images", SPIE Medical Imaging, February 2001.

Physical characteristics of the nodules, such as rate of growth, pattern of calcification, type of margins are very important in the investigation of the solitary lung nodules. Every lung nodule grows in volume over time. However, the malignant nodules grow at an exponential rate, which is usually expressed as a tumor's doubling time. Malignant nodules have a doubling time of between 25 to 450 days whereas the benign nodules are stable and have a doubling time of more than 500 days. In addition to the rate of growth of the nodules, the pattern of the calcification is an important indicator of whether the nodule is benign or malignant. Nodules which are centrally or diffuse calcified are usually benign.

Before the nodules can be characterized, it is necessary to detect them in the volume of the 3D CT image dataset that is being acquired. Manual lung nodule detection, which was possible using CXR, is no longer possible. It is necessary to have automated tools that can assist a physician in quickly detecting the nodules. A number of automated lung nodule systems have already been proposed, as described by: Cabello et al., in "Computer-aided Diagnosis: A Neural Network Based Approach to Lung Nodule Detection", IEEE Transactions on Medical Image, 17(6), pp. 872–80, 1998; Hara et al., in "Nodule Detection on Chest Helical CT Scans by Using a Genetic Algorithm", Proceedings of the 1997 IASTED International Conference on Intelligent Information, 1997; Aberle et al., in "Computer-aided Method for Lung Micronodule Detection in CT", Radiology, 217(P), 2000; Fan et al., in "Automatic Detection of Cellular Necrosis in Epithelial Cell Cultures", SPIE Medical Imaging, February 2001; Cox et al., in "Experiments in Lung Cancer Nodule Detection Using Texture Analysis and Neural Network Classifiers", at citeseer.nj.nec.com/cox92experiments.html, 1992; Gonzalez et al., in "Application of Computer-performed Holographic Recognition to Lung Nodule Detection and Evaluation in Thoracic CT Scans", European Congress of Radiology (ECR), 2000; Kanazawa et al., in "Computer-aided Diagnosis of Pulmonary Nodules Based on Helical CT Images, Comput. Med. Imaging Graph., 22, pp. 157–67, 1998; Armato et al., in "Three-dimensional Approach to Lung Nodule Detection in Helical CT", SPIE Medical Imaging, 3661, pp. 553–59, 1999. While the automated detection of the lung nodules is a very important task, segmenting the nodules once they have been detected remains to be an equally challenging task. The difficulty of the task comes from the fact that some of the nodules may be sitting on the chest wall or on the lung vessels. Accurate and consistent segmentation of the lung nodule over time acquired CT volume datasets is necessary to study the rate of growth of the nodules and hence to predict whether the nodule is malignant or benign.

Accordingly, it would be desirable and highly advantageous to have a method for automatically segmenting lung nodules that can consistently and robustly segment not only solitary nodules but also nodules attached to lung walls and vessels.

SUMMARY OF THE INVENTION

The problems stated above, as well as other related problems of the prior art, are solved by the present invention, a method for automatically segmenting lung nodules using dynamic programming and Expectation Maximization (EM) classification.

According to an aspect of the present invention, there is provided a method for automatically segmenting lung nodules in a three-dimensional (3D) Computed Tomography (CT) volume dataset. An input is received corresponding to a user-selected point near a boundary of a nodule. A model is constructed of the nodule from the user-selected point, the model being a deformable circle having a set of parameters $\beta$ that represent a shape of the nodule. Continuous parts of the boundary and discontinuities of the boundary are estimated until the set of parameters β converges, using dynamic programming and Expectation Maximization (EM). The nodule is segmented, based on estimates of the continuous parts of the boundary and the discontinuities of the boundary.

According to another aspect of the present invention, the set of parameters $\beta=[O, s]^T$, with O being a position of the model, s being a scale of the model, and T being a transpose of a vector corresponding to the position O and the scale s of the model.

According to yet another aspect of the present invention, the method further includes the step of representing the boundary as a sum B, where $B=(\cup_i B_{ci})\cup(\cup_j B_{dj})$, $B_{ci}$ represents continuous parts of the boundary and $B_{dj}$ represents discontinuities of the boundary.

According to still yet another aspect of the present invention, the estimating step includes the following steps. The continuous parts $B_{ci}$ of the boundary are estimated based on a Maximum A-posteriori (MAP) estimate according to an equation $B_{ci}=\arg\max B_{ci}\ p(B_{ci}|I, \beta)$, with I being a slice from the 3D CT volume dataset. A MAP density is estimated as $p(B_{ci}|I, \beta)=1/z\ \exp(E_\beta(B_{ci}))$, with $E_\beta(B_{ci})$ being a sum of internal shape and external image energies, and z being a normalization constant. The sum of internal shape and external image energies $E_\beta(B_{ci})$ are minimized using a time-delayed discrete dynamic programming method. The continuous parts $B_{ci}$ of the boundary are connected to obtain an estimate of the discontinuities $B_{dj}$ of the boundary. The set of parameters β are updated, based upon a circle fitting method being applied to the continuous parts $B_{ci}$ and the discontinuities $B_{dj}$ of the boundary.

According to a further aspect of the present invention, the constructing step comprises the step of increasing a radius of the deformable circle until the radius contacts high gradient points in the 3D CT volume dataset.

According to a still further aspect of the present invention, the method further comprises the step of pre-processing a region-of-interest that encompasses the user-selected point using an Expectation Maximization (EM) based method, so as to classify and remove a calcification from the region-of-interest.

According to an additional aspect of the present invention, the pre-processing step removes the high gradient points that result from the calcification of the nodule.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for automatically segmenting lung nodules using dynamic programming and Expectation Maximization (EM) classification.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
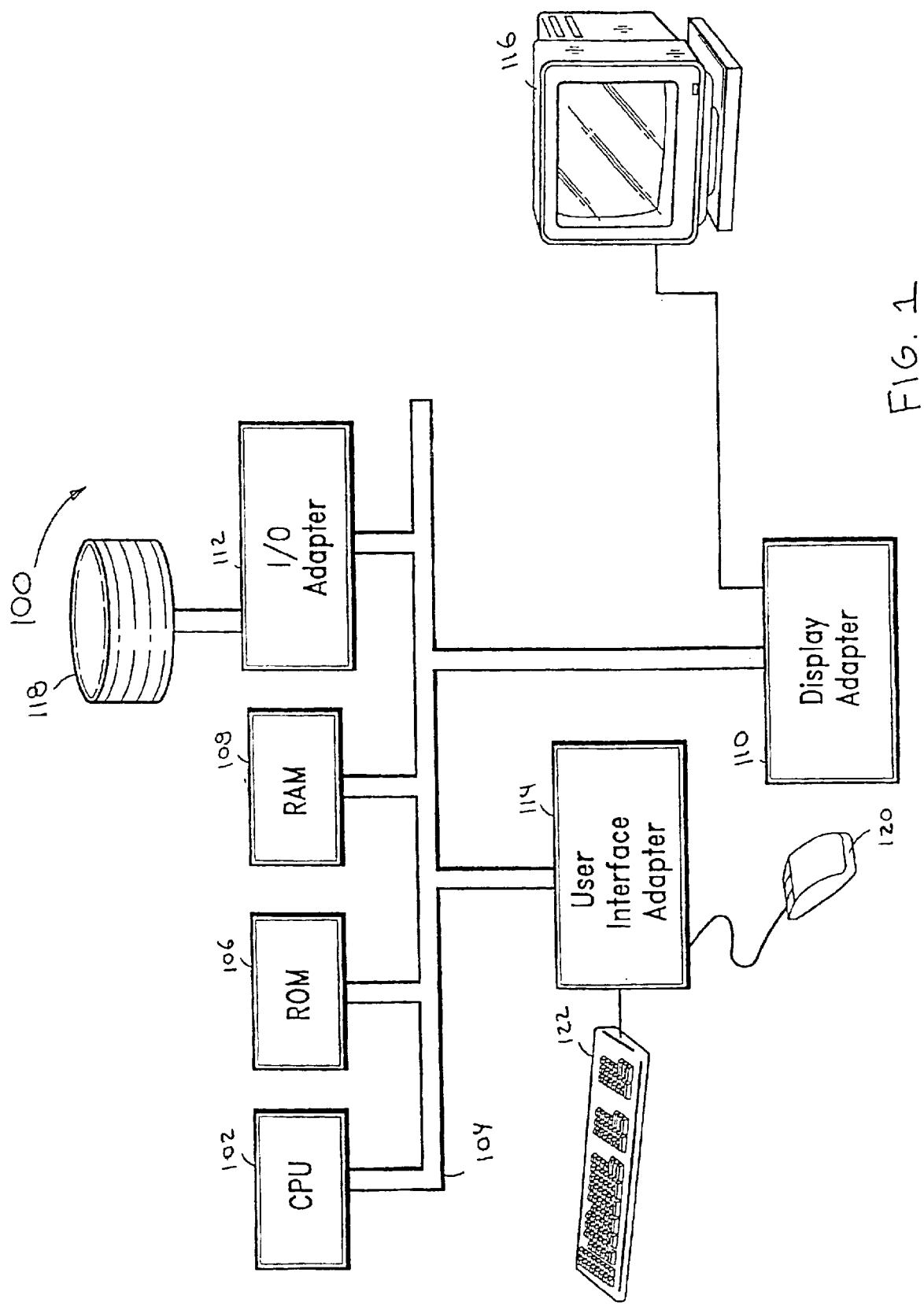
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

The present invention provides a robust and automated method for segmenting lung nodules in a three-dimensional (3D) Computed Tomography (CT) volume dataset. Nodules are segmented out on a slice-per-slice basis. That is, we first process each CT slice separately to extract two dimensional (2D) contours of a nodule which can then be stacked together to get the whole 3D surface. The extracted 2D contours are optimal as we utilize a dynamic programming based optimization algorithm. To extract each 2D contour, we utilize a shape-based constraint; that is, we initially construct a circle from a user (e.g., physician) specified point on the nodule boundary. This initial circle gives us a rough initialization of the nodule from where our dynamic programming based algorithm estimates the optimal contour. As a nodule can be calcified, we pre-process a small region-of-interest around the physician selected point on the nodule boundary using the Expectation Maximization (EM) based algorithm to classify and remove calcification. Advantageously, the present invention can be consistently and robustly used to segment not only solitary nodules but also nodules attached to lung walls and vessels.

Figure 2:
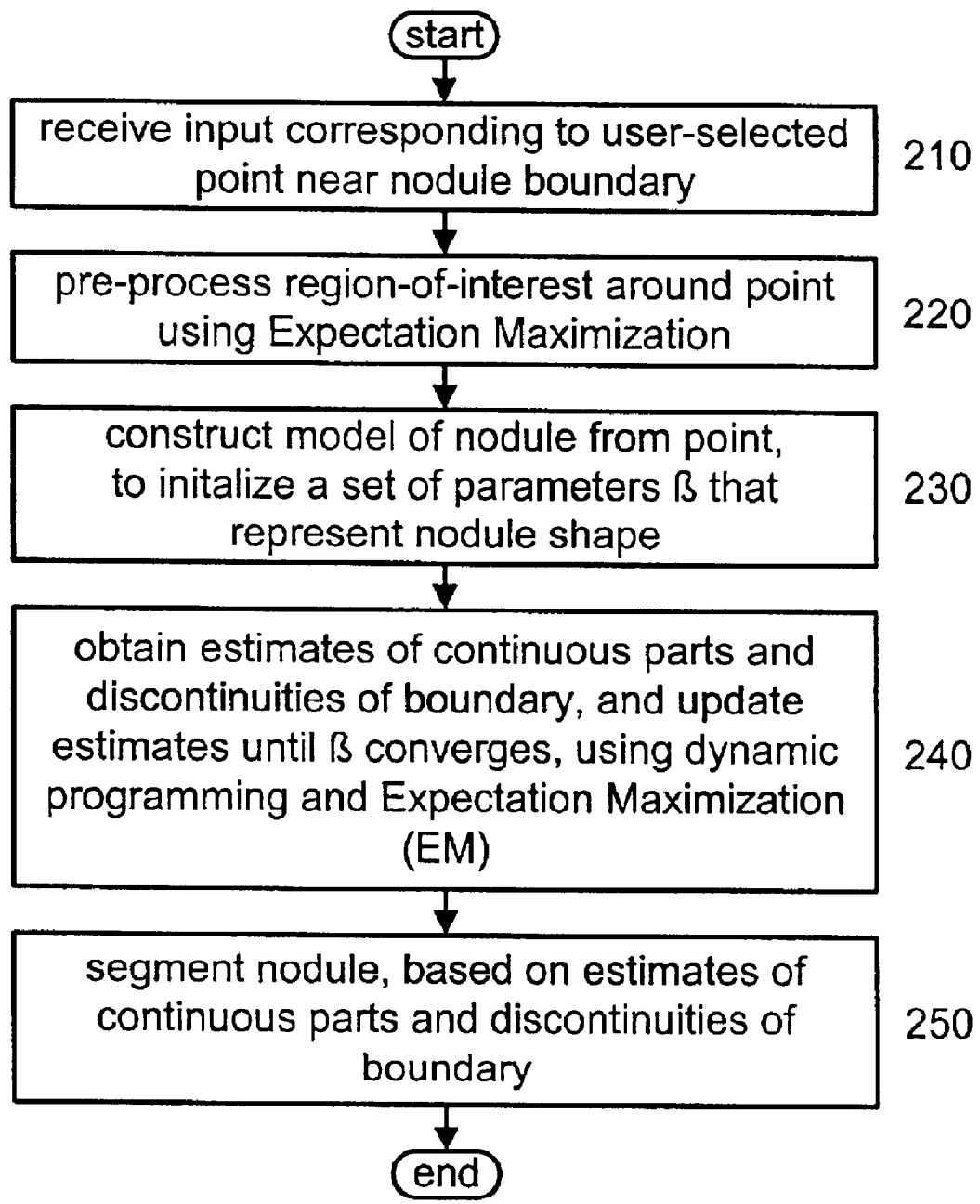
FIG. 2 is a flow diagram illustrating a method for segmenting lung nodules from Computed Tomography (CT) volume slices, according to an illustrative embodiment of the present invention.

FIG. 2 is a flow diagram illustrating a method for segmenting lung nodules from Computed Tomography (CT) volume slices, according to an illustrative embodiment of the present invention.

An input is received corresponding to a user-selected point near a boundary of a nodule (step 210). A region-of-interest that encompasses the user-selected point is pre-processed using Expectation Maximization (EM) to classify and remove calcification (step 220). A deformable, circular model of the nodule is constructed from the user-selected point (step 230). The model has a set of parameters $\beta$ that represent a shape of the nodule.

Estimates of the continuous parts and the discontinuities of the boundary are obtained and then updated until the set of parameters $\beta$ converges, using dynamic programming and Expectation Maximization (step 240). The nodule is segmented, based on estimates of the continuous parts and the discontinuities of the boundary (step 250).

Figure 3:
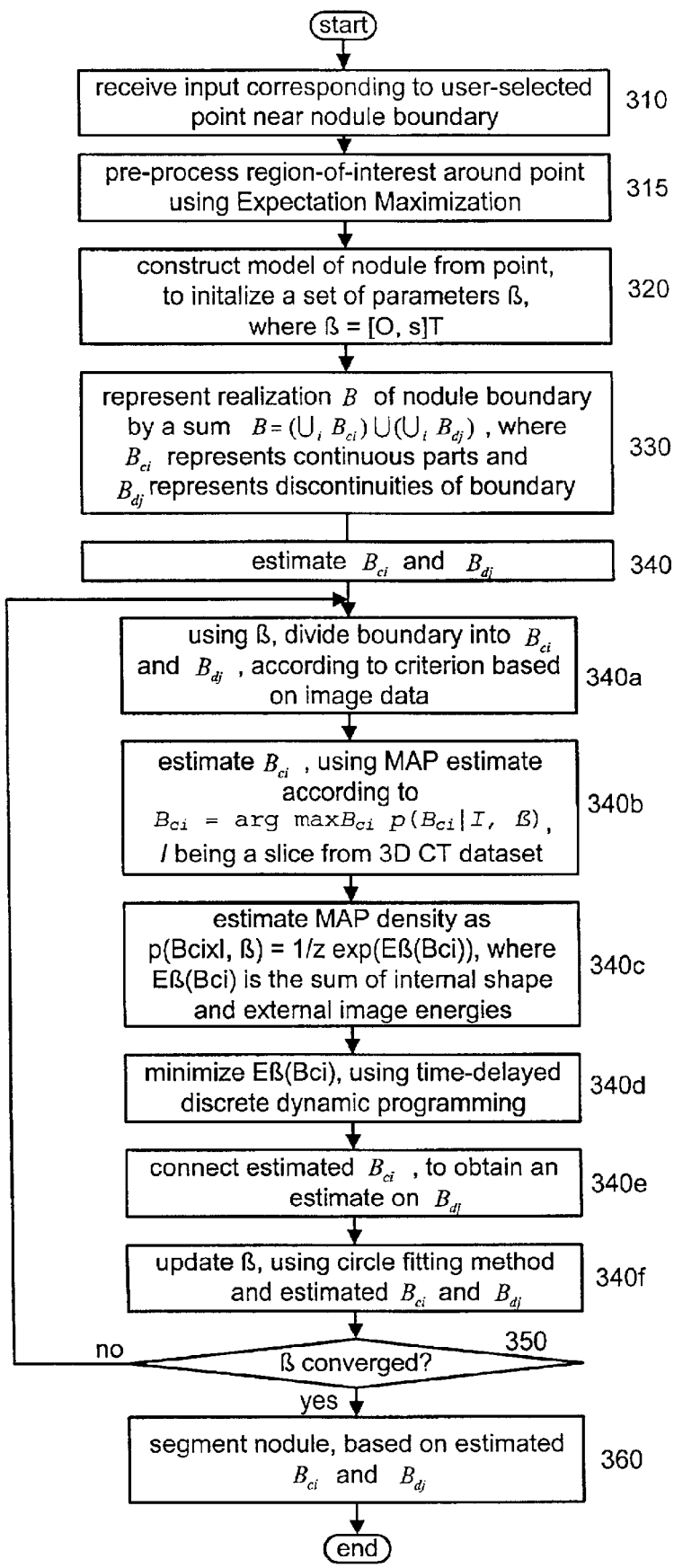
FIG. 3 is a flow diagram illustrating a method for segmenting lung nodules from Computed Tomography (CT) volume slices, according to another illustrative embodiment of the present invention.

FIG. 3 is a flow diagram illustrating a method for segmenting lung nodules from Computed Tomography (CT) volume slices, according to another illustrative embodiment of the present invention.

An input is received corresponding to a user-selected point near a boundary of a nodule (step 310). A region-of-interest that encompasses the user-selected point is preprocessed using Expectation Maximization (EM) to classify and remove calcification (step 315). A model of the nodule is constructed from the user-selected point, to initialize a set of parameters $\beta$ that represent the shape of the nodule (step 320). In particular, the nodule is modeled as a deformable circle in 2D slices. The model takes into account the shape of the nodule, the position of the nodule, and continuities and discontinuities in the boundaries of the nodule. Let $\beta=[O, s]^T$, where O is the position of the model, s represents the scale of the model, and T represents the transpose of a vector corresponding to the position O and the scale s of the model.

As the nodule can be attached to a lung wall or to blood vessels, there are many discontinuities in the nodule boundaries. A realization B of a boundary of the nodule is represented by a sum $B=(\cup_i B_{ci}) \cup (\cup_i B_{dj})$, where $B_{ci}$ represents the continuous part of the boundary and $B_{dj}$ represents the discontinuities of the boundary (step 330).

Both the continuities B and the discontinuities $B_{dj}$ are estimated using an iterative loop (step 340). The loop includes steps 340a through 340f.

Using this $\beta$, the boundary of the nodule is divided into a continuous part $B_{ci}$ and a discontinuous part $B_{dj}$ according to a criterion that is based on the image data of the 3D CT volume dataset (step 340a).

For each continuous part $B_{ci}$, a Maximum A-posteriori (MAP) estimate is used according to the equation $B_{ci}=\arg \max_{B_{ci}} p(B_{ci}\xi I, \beta)$ where I is the slice from the CT volume data set (step 340b). A MAP density is estimated as $p(B_{ci}\xi I, \beta)=1/z \exp(E_\beta(B_{ci}))$, wherein $E_\beta(B_{ci})$ is the sum of internal shape and external image energies, and z is a normalization constant (also referred to as a "partition function") (step 340c). The sum of the internal shape and external image energies $E_\beta(B_{ci})$ is minimized using a time-delayed discrete dynamic programming method (step 340d).

The estimated $B_{ci}$ are then connected to obtain an estimate on $B_{dj}$ (step 340e). These estimated $B_{ci}$ and $B_{dj}$ are then used to update $\beta$ using a circle fitting method (step 340f). Steps 340a to 340f are repeated until $\beta$ converges (step 350). Upon convergence, the loop is terminated.

A description of pre-processing using an EM based method will now be given according to an illustrative embodiment of the present invention. This pre-processing step is employed at steps 220 and 315 of the methods of FIGS. 2 and 3, respectively. Since the initially created circle is used as an initialization of the nodule boundary, this step is paramount. The radius of the circle is increased until it hits high gradient points in the image. Due to calcification of the nodules, there will be high gradient points in the nodule itself leading to erroneous initialization. To overcome this problem, we pre-process a region of interest around the selected point using the Expectation Maximization (EM) algorithm to remove any calcification in the nodule. The EM algorithm is described by Dempster et al., in "Maximum Likelihood from Incomplete Data via EM Algorithm", J. Royal Statistical Soc., Ser. B, 39:1–38, 1977.

Figure 4:
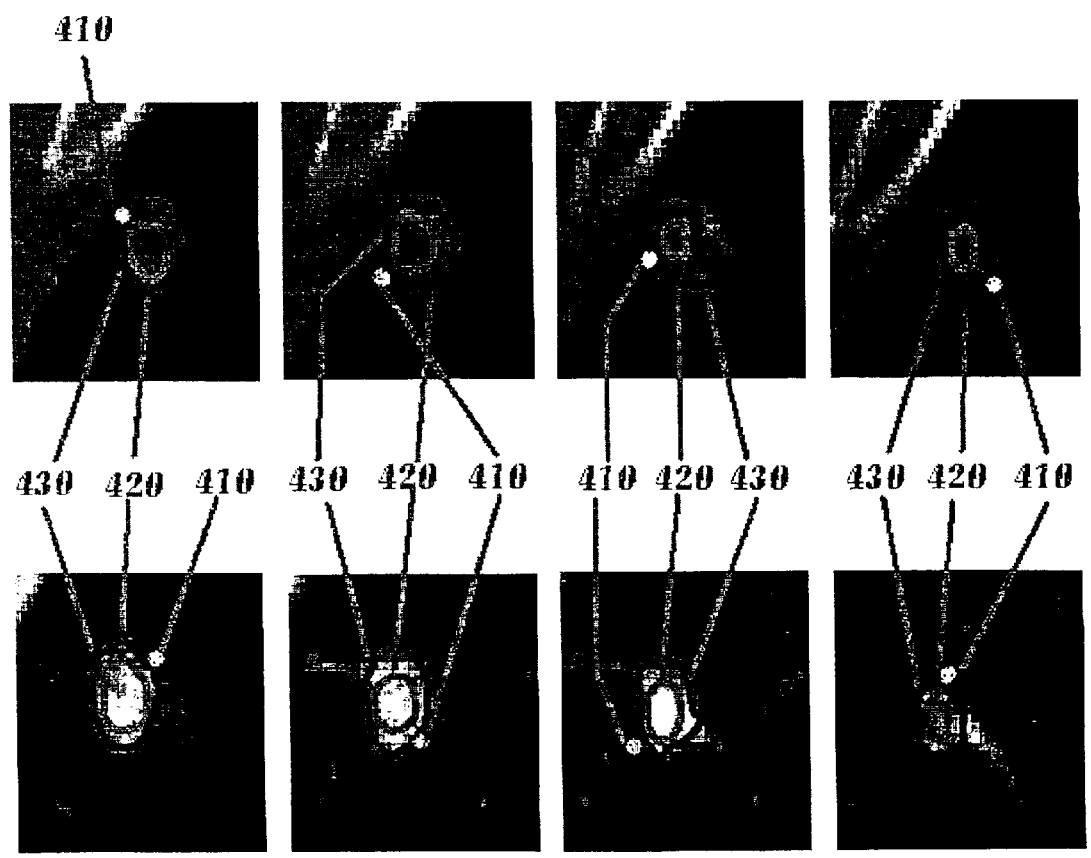
FIG. 4 is a sequence of images illustrating results obtained by the present invention where a region-of-interest was not pre-processed using the EM algorithm, according to an illustrative embodiment of the present invention.

A description of test results of the present invention will now be given according to an illustrative embodiment thereof. FIG. 4 is a sequence of images illustrating results obtained by the present invention where a region-of-interest was not pre-processed using the EM algorithm, according to an illustrative embodiment of the present invention. The user-selected point 410, the initial circle 420, and the estimated nodule boundary 430 are shown. These results show that the present invention is able to segment nodules attached to vessels. However, if a nodule is calcified, then the present invention may provide less than optimum results. Thus, pre-processing the region of interest is important in obtaining proper results by the present invention.

Figure 5:
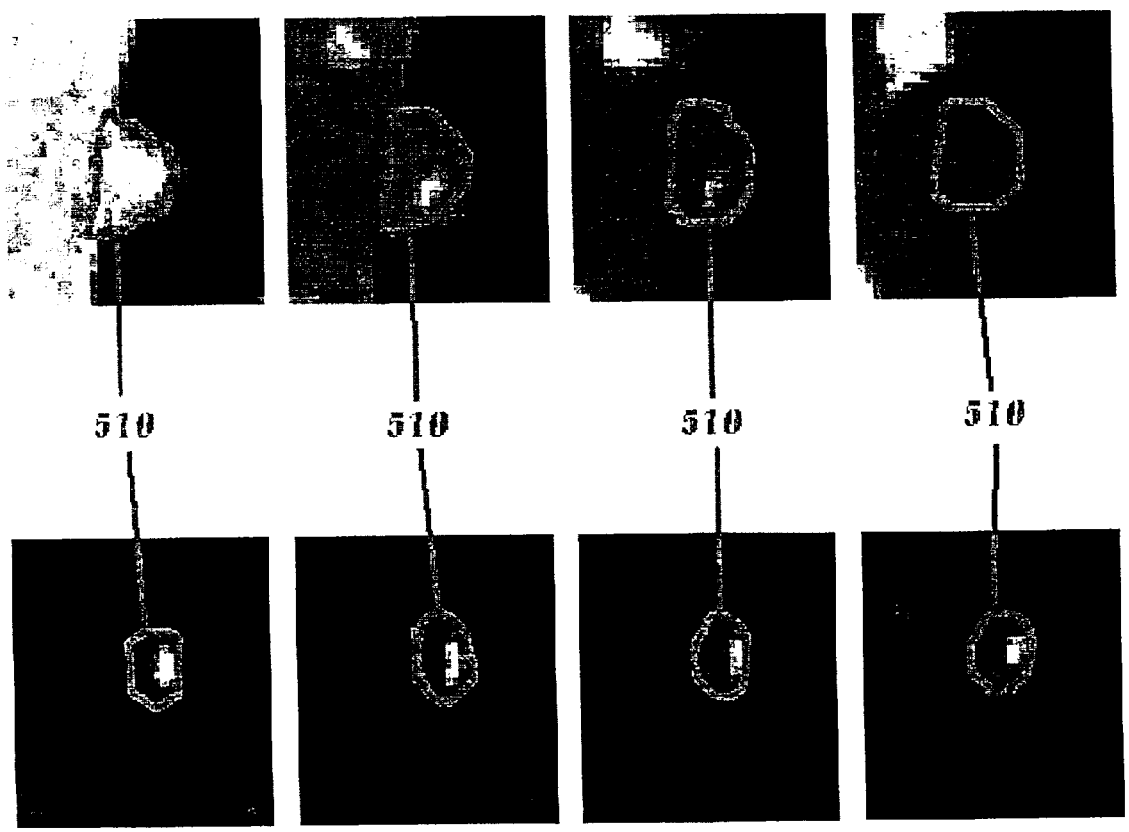
FIG. 5 is a sequence of images illustrating results obtained by the present invention where a region-of-interest was pre-processed using the EM algorithm, according to an illustrative embodiment of the present invention.

FIG. 5 is a sequence of images illustrating results obtained by the present invention where a region-of-interest was pre-processed using the EM algorithm, according to an illustrative embodiment of the present invention. The top row of images in FIG. 5 shows that the present invention can be used to segment the nodules that are attached to the lung wall. The estimated nodule boundary 510 is shown. Note that the nodule has been cleanly cut from the wall. The bottom row of FIG. 5 illustrates that the present invention can be used to segment isolatory nodules as well.

In sum, the present invention provides an automated lung nodule segmentation algorithm where the segmentation of the nodule is carried out per slice basis from the initial physician selected point. The present invention can be used to segment a variety of nodules, nodules attached to a lung wall, isolatory nodules, and nodules attached to vessels. For each slice, the automated algorithm, after pre-processing using EM, takes only about 1 second to compute the optimal contour. Once the 2D contours of a nodule have been segmented out of the CT volume dataset, the surface fitting algorithm can be used to fit a surface. The surface fitting algorithm is described by Bernhard Geiger, in "Three-Dimensional Modelling of Human Organs and its Application to Diagnosis and Surgical Planning", PhD Thesis, INRIA, number 2105, France, 1993. Of course, the present invention is not limited to the preceding surface fitting algorithm and, thus, other surface fitting algorithms may be used while maintaining the spirit and scope of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for automatically segmenting lung nodules in a three-dimensional (3D) Computed Tomography (CT) volume dataset, comprising the steps of:
   receiving an input corresponding to a user-selected point near a boundary of a nodule;
   constructing a model of the nodule from the user-selected point, the model being a deformable circle having a set of parameters β that represent a shape of the nodule;
   estimating continuous parts of the boundary and discontinuities of the boundary until the set of parameters β converges, using dynamic programming and Expectation Maximization (EM); and
   segmenting the nodule, based on estimates of the continuous parts of the boundary and the discontinuities of the boundary.

2. The method of claim 1, wherein the set of parameters $\beta=[O, s]^T$, O being a position of the model, s being a scale of the model, and T being a transpose of a vector corresponding to the position O and the scale s of the model.

3. The method of claim 2, further comprising the step of representing the boundary as a sum B, where $B=(\cup_i B_{ci}) \cup (\cup_i B_{dj})$, $B_{ci}$ represents continuous parts of the boundary and $B_{dj}$ represents discontinuities of the boundary.

4. The method of claim 3, wherein said estimating step includes the steps of;
   estimating the continuous parts $B_{ci}$ of the boundary based on a Maximum A-posteriori (MAP) estimate according to an equation $B_{ci}=\arg\max B_{ci} \, p(B_{ci} \xi I, \beta)$, I being a slice from the 3D CT volume dataset;
   estimating a MAP density as $p(B_{ci} \xi I, \beta)=1/z \exp(E_\beta(B_{ci}))$, $E_\beta(B_{ci})$ being a sum of internal shape and external image energies, and z being a normalization constant;
   minimizing the sum of internal shape and external image energies $E_\beta(B_{ci})$ using a time-delayed discrete dynamic programming method;
   connecting the continuous parts $B_{ci}$ of the boundary to obtain an estimate of the discontinuities $B_{dj}$ of the boundary; and
   updating the set of parameters β, based upon a circle fitting method being applied to the continuous parts $B_{ci}$ and the discontinuities $B_{dj}$ of the boundary.

5. The method of claim 1, wherein said constructing step comprises the step of increasing a radius of the deformable circle until the radius contacts high gradient points in the 3D CT volume dataset.

6. The method of claim 5, further comprising the step of pre-processing a region-of-interest that encompasses the user-selected point using an Expectation Maximization (EM) based method, so as to classify and remove a calcification from the region-of-interest.

7. The method of claim 6, wherein said pre-processing step removes the high gradient points that result from the calcification of the nodule.

8. A method for automatically segmenting lung nodules in a three-dimensional (3D) Computed Tomography (CT) volume dataset, comprising the steps of:
   receiving an input corresponding to a user-selected point near a boundary of a nodule;
   constructing a model of the nodule from the user-selected point, the model being a deformable circle having a set of parameters β that represent a shape of the nodule, where $\beta=[O, s]^T$, O being a position of the model, s being a scale of the model, and T being a transpose of a vector corresponding to the position O and the scale s of the model;
   representing the boundary as a sum B, where $B=(\cup_i B_{ci}) \cup (\cup_i B_{dj})$, $B_{ci}$ represents continuous parts of the boundary and $B_{dj}$ represents discontinuities of the boundary;
   estimating the boundary, wherein said estimating step includes the steps of;
      estimating the continuous parts $B_{ci}$ of the boundary based on a Maximum A-posteriori (MAP) estimate according to an equation $B_{ci}=\arg\max B_{ci} \, p(B_{ci} \xi I, \beta)$, I being a slice from the 3D CT volume dataset;
      estimating a MAP density as $p(B_{ci} \xi I, \beta)=1/z \exp(E_\beta(B_{ci}))$, $E_\beta(B_{ci})$ being a sum of internal shape and external image energies;
      minimizing the sum of internal shape and external image energies $E_\beta(B_{ci})$ using a time-delayed discrete dynamic programming method;
      connecting the continuous parts $B_{ci}$ of the boundary to obtain an estimate of the discontinuities $B_{dj}$ of the boundary;
      updating the set of parameters β, based upon a circle fitting method being applied to the continuous parts $B_{ci}$ and the discontinuities $B_{dj}$ of the boundary;
      repeating said step of estimating the boundary until the set of parameters β converges; and
   segmenting the nodule, based on estimates of the continuous parts of the boundary and the discontinuities of the boundary.

9. The method of claim 8, wherein said constructing step comprises the step of increasing a radius of the deformable circle until the radius contacts high gradient points in the 3D CT volume dataset.

10. The method of claim 9, further comprising the step of pre-processing a region-of-interest that encompasses the user-selected point using an Expectation Maximization (EM) based method, so as to classify and remove a calcification from the region-of-interest.

11. The method of claim 10, wherein said pre-processing step removes the high gradient points that result from the calcification of the nodule.

12. A program storage device readable by machine, tangibly embodying a program of instructions executable by the machine to perform method steps for automatically segmenting lung nodules in a three-dimensional (3D) Computed Tomography (CT) volume dataset, said method steps comprising:
   receiving an input corresponding to a user-selected point near a boundary of a nodule;
   constructing a model of the nodule from the user-selected point, the model being a deformable circle having a set of parameters β that represent a shape of the nodule;
   estimating continuous parts of the boundary and discontinuities of the boundary until the set of parameters β converges, using dynamic programming and Expectation Maximization (EM); and
   segmenting the nodule, based on estimates of the continuous parts of the boundary and the discontinuities of the boundary.

13. The program storage device of claim 12, wherein the set of parameters $\beta=[O, s]^T$, O being a position of the model, s being a scale of the model, and T being a transpose of a vector corresponding to the position O and the scale s of the model.

14. The program storage device of claim 13, further comprising the step of representing the boundary as a sum B, where $B=(\cup_i B_{ci}) \cup (\cup_i B_{dj})$, $B_{ci}$ represents continuous parts of the boundary and $B_{dj}$ represents discontinuities of the boundary.

15. The program storage device of claim 14, wherein said estimating step includes the steps of;

estimating the continuous parts $B_{ci}$ of the boundary based on a Maximum A-posteriori (MAP) estimate according to an equation $B_{ci}=\arg \max B_{ci}\ p(B_{ci}\xi I, \beta)$, I being a slice from the 3D CT volume dataset;

estimating a MAP density as $p(B_{ci}\xi I, \beta)=1/z\ \exp(E_\beta(B_{ci}))$, $E_\beta(B_{ci})$ being a sum of internal shape and external image energies, and z being a normalization constant;

minimizing the sum of internal shape and external image energies $E_\beta(B_{ci})$ using a time-delayed discrete dynamic programming method;

connecting the continuous parts $B_{ci}$ of the boundary to obtain an estimate of the discontinuities $B_{dj}$ of the boundary; and updating the set of parameters $\beta$, based upon a circle fitting method being applied to the continuous parts $B_{ci}$ and the discontinuities $B_{dj}$ of the boundary.

16. The program storage device of claim 12, wherein said constructing step comprises the step of increasing a radius of the deformable circle until the radius contacts high gradient points in the 3D CT volume dataset.

17. The program storage device of claim 16, further comprising the step of pre-processing a region-of-interest that encompasses the user-selected point using an Expectation Maximization (EM) based method, so as to classify and remove a calcification from the region-of-interest.

18. The program storage device of claim 17, wherein said pre-processing step removes the high gradient points that result from the calcification of the nodule.

\* \* \* \* \*